United States Patent
Goeller et al.

(10) Patent No.: US 9,476,308 B2
(45) Date of Patent: Oct. 25, 2016

(54) GAS TURBINE ENGINE SERPENTINE COOLING PASSAGE WITH CHEVRONS

(71) Applicant: United Technologies Corporation, Hartford, CT (US)

(72) Inventors: Travis Goeller, West Hartford, CT (US); Erik R. Granstrand, West Hartford, CT (US); Irwin D. Singer, West Hartford, CT (US); Dominic J. Mongillo, Jr., West Hartford, CT (US); Edward F. Pietraszkiewicz, Southington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 919 days.

(21) Appl. No.: 13/728,069

(22) Filed: Dec. 27, 2012

(65) Prior Publication Data

US 2014/0212297 A1   Jul. 31, 2014

(51) Int. Cl.
F01D 5/18 (2006.01)

(52) U.S. Cl.
CPC .............. *F01D 5/188* (2013.01); *F01D 5/187* (2013.01); *F05D 2250/185* (2013.01); *F05D 2260/22141* (2013.01); *Y02T 50/676* (2013.01)

(58) Field of Classification Search
CPC ................... F01D 5/187; F01D 5/188; F05D 2260/2212; F05D 2260/22141
See application file for complete search history.

(56) References Cited

U.S. PATENT DOCUMENTS

| | | | |
|---|---|---|---|
| 3,741,285 A * | 6/1973 | Kuethe | B64C 21/10 165/109.1 |
| 4,180,373 A * | 12/1979 | Moore | F01D 5/187 415/115 |
| 4,775,296 A | 10/1988 | Schwarzmann et al. | |
| 5,052,889 A | 10/1991 | Abdel-Messeh | |
| 5,395,212 A * | 3/1995 | Anzai | F01D 5/187 415/115 |
| 5,488,825 A * | 2/1996 | Davis | F01D 5/187 415/115 |
| 6,406,260 B1 | 6/2002 | Trindade et al. | |
| 7,641,445 B1 * | 1/2010 | Liang | F01D 5/187 416/97 R |
| 7,785,072 B1 * | 8/2010 | Liang | F01D 5/187 416/97 R |
| 7,988,419 B1 * | 8/2011 | Liang | F01D 5/187 416/96 R |
| 8,025,482 B1 | 9/2011 | Liang | |
| 8,096,767 B1 | 1/2012 | Liang | |
| 8,177,492 B2 | 5/2012 | Knapp et al. | |
| 8,210,812 B2 | 7/2012 | Abdel-Messeh et al. | |

(Continued)

OTHER PUBLICATIONS

International Search & Written Opinion for PCT/US2013/073558. Completion of Search Mar. 24, 2014.

(Continued)

*Primary Examiner* — Richard Edgar
*Assistant Examiner* — Eldon Brockman
(74) *Attorney, Agent, or Firm* — Carlson, Gaskey & Olds, P.C.

(57) ABSTRACT

A gas turbine engine component includes a structure having a cooling passage providing upstream and downstream portions separated from one another by an inner wall and fluidly connected by a bend. First and second trip strips are respectively arranged in the upstream and downstream portions. The first trip strips are arranged at a first spacing from one another. The second trip strips are arranged at a second spacing from one another. A turbulence promoter is arranged in the bend and at a third spacing from the first trip strips that is different than the first spacing. The turbulence promoter is arranged at a fourth spacing from the second trip strips that is different than the second spacing.

11 Claims, 3 Drawing Sheets

(56) References Cited

U.S. PATENT DOCUMENTS

| | | |
|---|---|---|
| 2004/0076519 A1 | 4/2004 | Halfmann et al. |
| 2008/0050242 A1 | 2/2008 | Liang |
| 2008/0190114 A1* | 8/2008 | Surace .................... F01D 9/041 60/806 |
| 2009/0028692 A1* | 1/2009 | Surace .................... F01D 5/187 415/115 |
| 2010/0239431 A1* | 9/2010 | Liang ...................... F01D 5/187 416/97 R |
| 2011/0070097 A1 | 3/2011 | Surace et al. |
| 2011/0286857 A1 | 11/2011 | Gleiner et al. |
| 2014/0219813 A1* | 8/2014 | Perez ...................... F01D 5/188 416/96 R |

OTHER PUBLICATIONS

International Preliminary Report on Patentability for PCT Application No. PCT/US2013/073558, mailed Jul. 9, 2015.

* cited by examiner

GAS TURBINE ENGINE SERPENTINE COOLING PASSAGE WITH CHEVRONS

BACKGROUND

This disclosure relates to a gas turbine engine. More particularly, the disclosure relates to a serpentine cooling passage that may be incorporated into a gas turbine engine component, such as an airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components include internal cooling passages having turns that provide a serpentine shape, which create undesired pressure losses. Some of the cooling passages may include portions having turbulence promoters that enhance the cooling effects of the cooling flow through the cooling passage.

One type of turbulence promoter is chevron shaped trip strips that are arranged in the cooling passage. Regardless of the type of turbulence promoter, cooling passages suffer from flow separation where there are sharp turns in the flow path. Flow separation reduces the cooling effects in those areas.

SUMMARY

In one exemplary embodiment, a gas turbine engine component includes a structure having a cooling passage providing upstream and downstream portions separated from one another by an inner wall and fluidly connected by a bend. First and second trip strips are respectively arranged in the upstream and downstream portions. The first trip strips are arranged at a first spacing from one another. The second trip strips are arranged at a second spacing from one another. A turbulence promoter is arranged in the bend and at a third spacing from the first trip strips that is different than the first spacing. The turbulence promoter is arranged at a fourth spacing from the second trip strips that is different than the second spacing.

In a further embodiment of any of the above, the first and second trip strips are chevron-shaped.

In a further embodiment of any of the above, the first and second trip strips are arranged in a pair of adjoining columns.

In a further embodiment of any of the above, the turbulence promoter includes a chevron-shaped trip strip.

In a further embodiment of any of the above, the turbulence promoter is arranged at an apex of the bend, with trip strips absent in upstream and downstream areas between the turbulence promoter and the first and second trip strips.

In a further embodiment of any of the above, the bend includes an inner radius area and an outer radius area. The turbulence promoter is provided in the outer radius area but absent from the inner radius area.

In a further embodiment of any of the above, the adjoining columns are spaced apart from one another.

In a further embodiment of any of the above, the upstream and downstream portions are generally parallel with one another. The bend is configured to turn flow greater than 90°.

In a further embodiment of any of the above, the bend is between 135° and 225°.

In a further embodiment of any of the above, the bend is 180°.

In a further embodiment of any of the above, the chevron-shape is provided by multiple legs meeting at an apex The apex points in the direction of incoming flow through the passage In a further embodiment of any of the above, the gas turbine engine component comprises an airfoil including pressure and suction walls spaced apart from one another and joined at leading and trailing edges. The airfoil includes the cooling passage arranged between the pressure and suction walls.

In a further embodiment of any of the above, the cooling passage extends in the radial direction from a root supporting the airfoil toward a tip of the airfoil.

In one exemplary embodiment, a gas turbine engine component includes a structure having a cooling passage providing upstream and downstream portions separated from one another by an inner wall and fluidly connected by a bend. First and second trip strips are respectively arranged in the upstream and downstream portions. A turbulence promoter is arranged in the bend. The bend substantially free of the turbulence promoter in upstream and downstream areas is arranged respectively between the turbulence promoter and the first trip strips and the turbulence promoter and the second trip strips.

In a further embodiment of any of the above, the turbulence promoter is arranged at an apex of the bend, with trip strips absent in upstream and downstream areas between the turbulence promoter and the first and second trip strips.

In a further embodiment of any of the above, the first and second trip strips are chevron-shaped. The turbulence promoter includes a chevron-shaped trip strip.

In a further embodiment of any of the above, the turbulence promoter includes a pair of chevron-shaped trip strips.

In a further embodiment of any of the above, the bend includes an inner radius area and an outer radius area. The turbulence promoter is provided in the outer radius area but absent from the inner radius area.

BRIEF DESCRIPTION OF THE DRAWINGS

The disclosure can be further understood by reference to the following detailed description when considered in connection with the accompanying drawings wherein.

DETAILED DESCRIPTION

Figure 1:
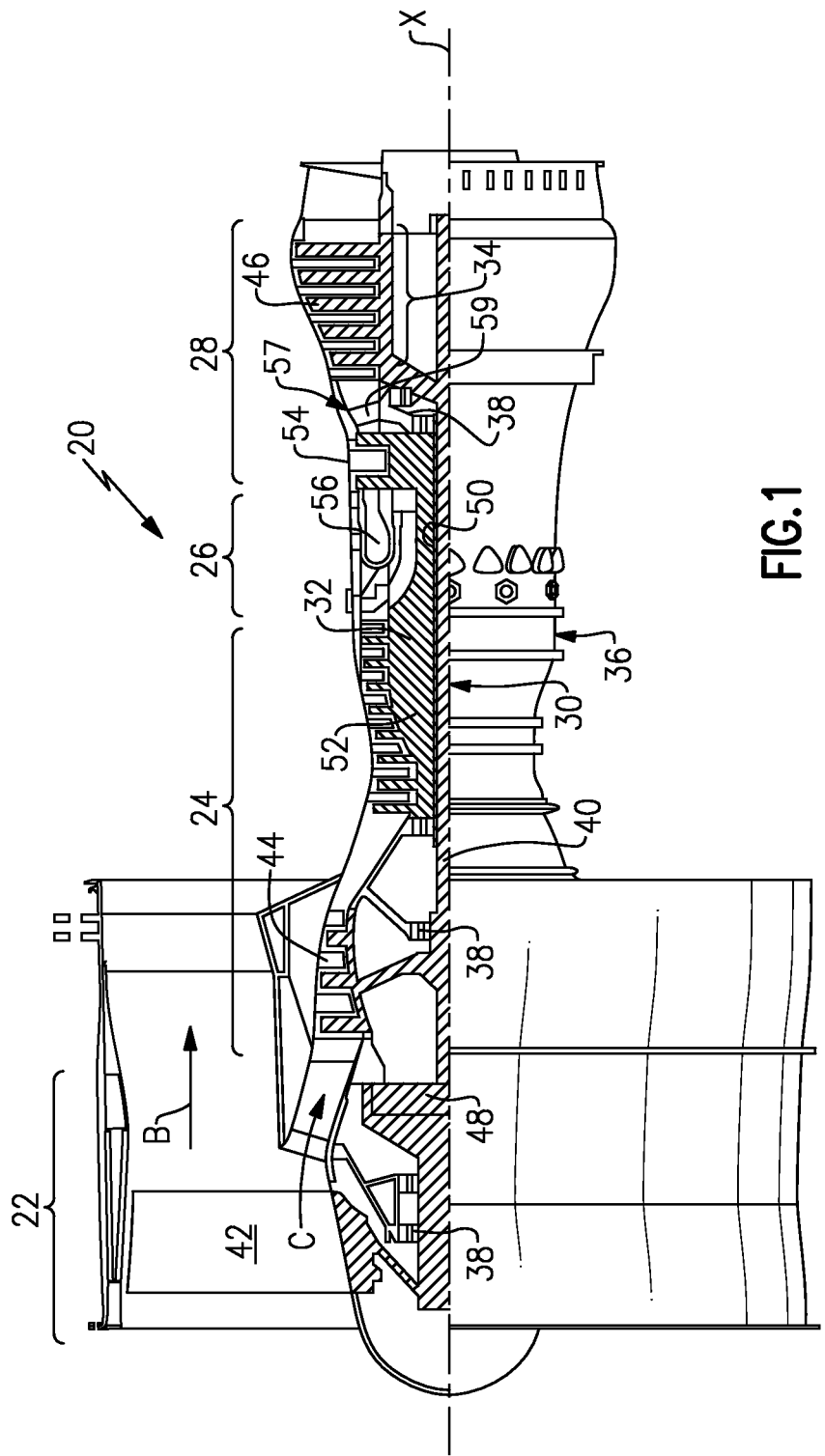
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram} \, °\text{R})/(518.7° \, \text{R})]^{0.5}$. The "Low corrected fan tip speed", as disclosed herein according to one non-limiting embodiment, is less than about 1150 ft/second.

The disclosed serpentine cooling passage may be used in various gas turbine engine components. For exemplary purposes, a turbine blade 64 is described. It should be understood that the cooling passage may also be used in vanes, blade outer air seals, and turbine platforms, for example.

Figure 2A:
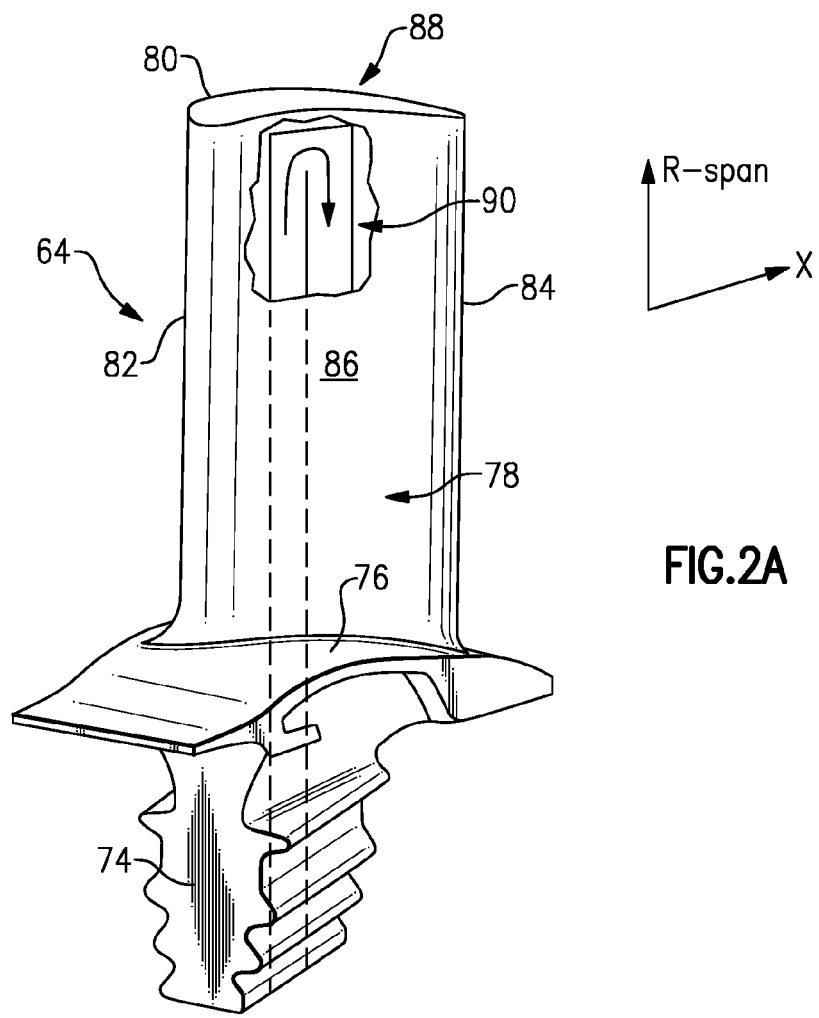
FIG. 2A is a perspective view of the airfoil having the disclosed cooling passage.
Figure 2B:
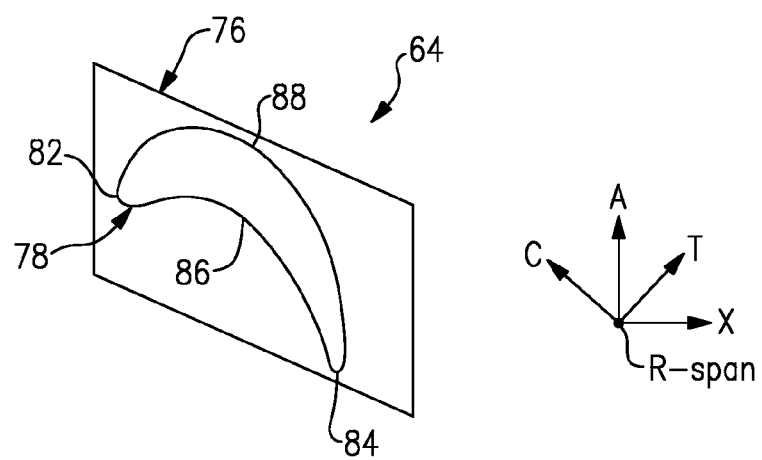
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Figure 3:
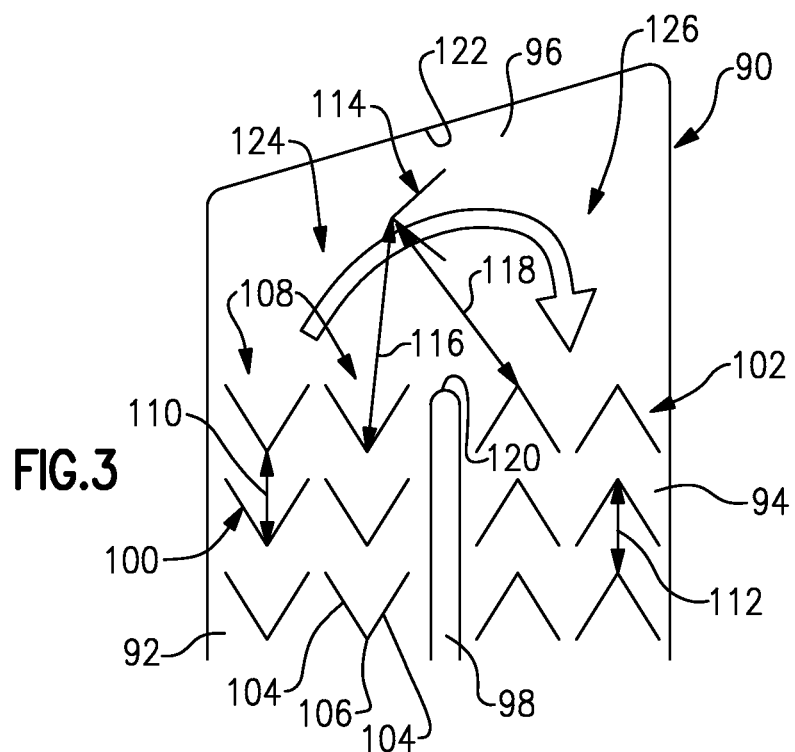
FIG. 3 is one example cross-sectional view of a cooling passage illustrated in FIG. 2A with turbulence promoters configured to minimize flow separation.

Flow through the cooling passage 90 illustrated in FIG. 2A is shown in more detail in FIG. 3. The cooling passage 90 includes an upstream portion 92 and a downstream portion 94 fluidly connected by a bend 96. In the example, a common inner wall 98 separates the upstream and downstream portions 92, 94. The upstream portion 92 includes an upstream region 100 providing an upstream passage through which cooling flow passes before reaching the bend 96. The bend 96 is greater than 90° and, for example, between 135° and 225°. In the example shown, the bend 96 is 180°.

In the example, the flow through the bend 96 (shown by the hollow arrow) separates as the flow is forced to turn, which decreases cooling efficiency in the area of separation. Typically, the sharper the bend 96, the greater the separation and loss in cooling efficiency. The flow through the upstream portion 92 has a fairly uniform velocity. As the flow enters the bend 96, the inside fluid stream lines accelerate faster, but cannot abruptly change directions, leading to flow separation.

First and second trip strips 100, 102 are respectively arranged in the upstream and downstream portions 92, 94. In the example, the trip strips 100, 102 are provided by chevron-shaped structures that include legs 104 angled relative to one another to provide an apex 106. The apex 106 faces the oncoming flow. In one example, the legs 104 are at an angle of 45° to 135°.

In the example illustrated, the trip strips 100, 102 are arranged in columns 108 such that a space 109 is provided between adjoining trip strips. The trip strips are generally uniformly spaced in the flow direction such that the first trip strips 100 are provided at a first spacing 110, and the second trip strips 102 are provided at a second spacing 112.

The bend 96 is substantially free from any turbulence promoting structures. However, it is desirable to use at least one turbulence promoter 114 in the bend 96 to inhibit flow separation in the bend 96. Upstream and downstream areas 124, 126 of the bend 96 are substantially free from turbulence promoting structures. Including the turbulence promoter 114 in the bend 96 decelerates the flow through the bend 96, which reduces flow separation.

The turbulence promoter 114 is positioned at a third spacing 116 from the first trip strip 100, and fourth spacing 118 from the second trip strips 102. The third and fourth spacings 116, 118 are respectively different than the first and second spacings 110, 112. In the example, the spacings are illustrated as the distance between the apexes. However, it should be understood that other means of determining the spacing may be used, in particular, depending upon the particular geometry of the trip strips.

Figure 4:
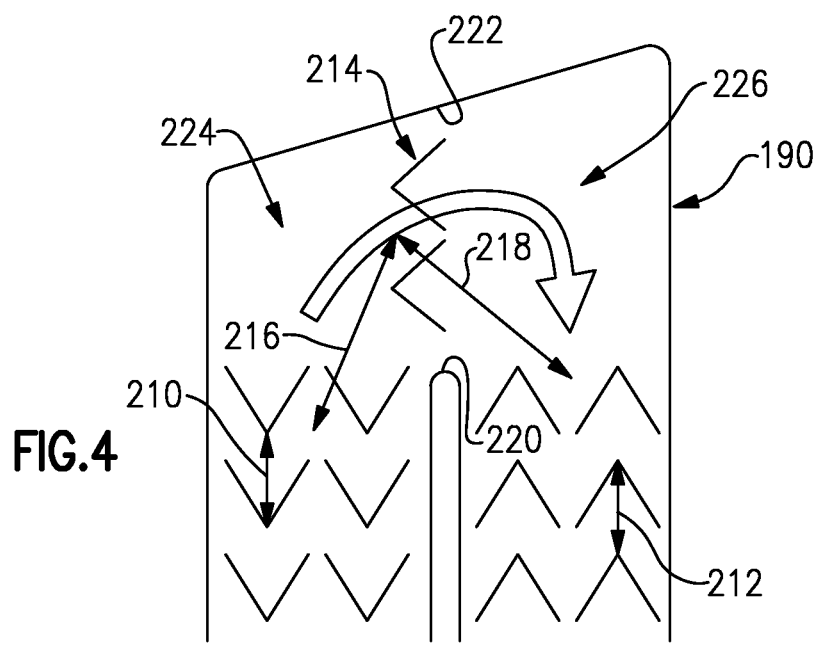
FIG. 4 is another example cross-sectional view of the cooling passage illustrated in FIG. 2A with turbulence promoters configured to minimize flow separation.

In the example, a single trip strip (FIG. 3) or a small cluster of trip strips (FIG. 4) is provided near the apex of the bend 96. In the example shown in FIG. 3, a single turbulence promoter 114 provided by a chevron shaped trip strip is arranged near the outer radius 122 of the bend 96 with no turbulence promoting structure near the inner radius 120 of the bend 96. The example shown in FIG. 4 utilizes a pair of trip strips as the turbulence promoter 214 such that the turbulence promoter 214 generally bridges the inner and outer radius 220, 222. The third and fourth spacings 216, 218, which are different than the first and second spacings 210, 212, are taken from a central location between adjacent trip strips.

Although example embodiments have been disclosed, a worker of ordinary skill in this art would recognize that certain modifications would come within the scope of the claims. For example, different type and arrangements of turbulence promoting features may be used. For that and other reasons, the following claims should be studied to determine their true scope and content.

What is claimed is:

1. A gas turbine engine component comprising:
    a structure having a cooling passage providing upstream and downstream portions separated from one another by an inner wall and fluidly connected by a bend;
    first and second trip strips respectively arranged in the upstream and downstream portion, wherein the first and second trip strips are chevron-shaped and each with an apex, the first trip strips include first apexes arranged at a first spacing from one another, and the second trip strips include second apexes arranged at a second spacing from one another; and
    a turbulence promoter is chevron-shaped with a third apex and is arranged in the bend at a third spacing from the third apex to the nearest first apex that is different than the first spacing, and the turbulence promoter arranged at a fourth spacing from the third apex to the nearest second apex that is different than the second spacing.

2. The gas turbine engine component according to claim 1, wherein the first and second trip strips are arranged in a pair of adjoining columns.

3. The gas turbine engine component according to claim 2, wherein the turbulence promoter is arranged at an apex of the bend, with trip strips absent in upstream and downstream areas between the turbulence promoter and the first and second trip strips.

4. The gas turbine engine component according to claim 3, wherein the bend includes an inner radius area and an outer radius area, the turbulence promoter provided in the outer radius area but absent from the inner radius area.

5. The gas turbine engine component according to claim 2, wherein the adjoining columns are spaced apart from one another.

6. The gas turbine engine component according to claim 1, wherein the upstream and downstream portions are generally parallel with one another, and the bend is configured to turn flow greater than 90°.

7. The gas turbine engine component according to claim 6, wherein the bend is between 135° and 225°.

8. The gas turbine engine component according to claim 7, wherein the bend is 180°.

9. The gas turbine engine component according to claim 2, wherein the chevron-shapes are provided by multiple legs meeting at the respective apex, the apex pointing in the direction of incoming flow through the passage.

10. The gas turbine engine component according to claim 1, wherein the gas turbine engine component comprises an airfoil including pressure and suction walls spaced apart from one another and joined at leading and trailing edges, the airfoil includes the cooling passage arranged between the pressure and suction walls.

11. The gas turbine engine component according to claim 10, wherein the cooling passage extends in the radial direction from a root supporting the airfoil toward a tip of the airfoil.

* * * * *